United States Patent [19]

Weber et al.

[11] Patent Number: 5,536,089
[45] Date of Patent: Jul. 16, 1996

[54] METHOD OF PRODUCING A COMPONENT HAVING AT LEAST ONE SPLIT RUNNING FACE FOR ROLLING ELEMENTS

[75] Inventors: Manfred Weber, Witten; Harald Neubert, Monheim; Uwe Eilrich, Lindlar, all of Germany

[73] Assignee: Sintermetallwerk Krebsöge GmbH, Radevormwald, Germany

[21] Appl. No.: 325,396

[22] PCT Filed: Jan. 26, 1994

[86] PCT No.: PCT/EP94/00198

§ 371 Date: Jan. 4, 1995

§ 102(e) Date: Jan. 4, 1995

[87] PCT Pub. No.: WO94/20765

PCT Pub. Date: Sep. 15, 1994

[30] Foreign Application Priority Data

Mar. 1, 1993 [DE] Germany ............ 43 06 280.6

[51] Int. Cl.⁶ ............... F16C 7/00; B23P 17/00
[52] U.S. Cl. ............ 384/294; 384/430; 384/503; 29/888.09
[58] Field of Search ............ 354/276, 288, 354/294, 295, 429, 430, 434, 503, 457; 29/888.09, 888.091, 888.092; 74/579 R, 579 E

[56] References Cited

U.S. PATENT DOCUMENTS

| 3,818,577 | 6/1974 | Bailey | 29/888.09 X |
| 4,198,879 | 4/1980 | Hornak et al. | 74/579 E |
| 4,884,900 | 12/1989 | Pirault et al. | 74/579 R X |
| 4,970,783 | 11/1990 | Olaniran et al. | 29/888.09 |
| 5,051,232 | 9/1991 | Summers | 419/27 |
| 5,208,979 | 5/1993 | Schmidt | 29/888.09 |

FOREIGN PATENT DOCUMENTS

| 0342800 | 11/1989 | European Pat. Off. | |
| 2443299 | 7/1980 | France. | |
| 3806236 | 8/1989 | Germany. | |
| 1731567 | 5/1992 | U.S.S.R. | 29/888.09 |
| 1371617 | 10/1974 | United Kingdom. | |
| 2245318 | 1/1992 | United Kingdom. | |

OTHER PUBLICATIONS

Patent Abstracts of Japan, vol. 8, No. 152 (M–309), Jul. 14, 1984 & JP59047524, Mar. 17, 1984.

Primary Examiner—Thomas R. Hannon
Attorney, Agent, or Firm—Spencer & Frank

[57] ABSTRACT

A component having a split running face for rolling elements, running face being disposed partially on a bearing cap, and a method of producing the same. According to the method, a preform is made from a material having a carbon content of at least 0.5 percent by weight; the preform is separated by fracture separation at a separation location of the preform thereby producing the bearing cap and a remainder; skin layer hardening is performed on the running face thereby producing a skin hardened layer such that the running face acquires a Rockwell hardness of 55 according to the Rockwell cone method.

20 Claims, 1 Drawing Sheet

METHOD OF PRODUCING A COMPONENT HAVING AT LEAST ONE SPLIT RUNNING FACE FOR ROLLING ELEMENTS

FIELD OF THE INVENTION

The invention relates to a method of producing a component having at least one split running face for rolling elements which is disposed partially on a bearing cap and partially on the component.

BACKGROUND OF THE INVENTION

Such components may be configured, for example, as connecting rods having a small connecting rod eye, a shaft and a large connecting rod eye, wherein the large connecting rod eye is provided with a split bearing seat for supporting the connecting rod at the crankshaft. Since the invention relates in particular to the production of a connecting rod, the discussion below is devoted primarily to a connecting rod, but only by way of example and not by way of limitation.

A connecting rod is generally produced in that first a preform is produced, e.g., by means of forging, casting or powder-metallurgy methods, with the inside dimension of the large connecting rod eye having an oversize in the region of the future separation location. At this location the large connecting rod is separated, e.g., by means of sawing, thus extensively eliminating the oversize. The separation surfaces of the connecting rod cap formed in this manner, on the one hand, and of the remainder of the connecting rod on the other are processed in a further method step, e.g., by means of grinding, so as to fit together precisely. In its finished state, the connecting rod cap is attached to the remainder of the connecting rod by means of connecting rod screws; the screw holes required for this purpose may be bored before or after separation. In the assembled state of the connecting rod, the mechanical processing of the bearing seat is subsequently effected to receive bearing shell halves, which are disposed between connecting rod and crankshaft, forming a friction bearing.

Another method of separating the connecting rod cap from the remainder of the connecting rod is known from DE-PS 38 06 236, where the connecting rod cap is separated from the remainder of the connecting rod by means of fracture separation. During this process, a fracture surface having a large, irregular surface is produced as separation surface, which almost excludes a lateral displacement of the connecting rod cap on the remainder of the connecting rod. This accomplishes, on the one hand, that the fastening of the bearing shells in the bearing seat of the connecting rod is improved and, on the other hand, that only the respective connecting rod cap that has been separated can be attached to the respective remainder of the connecting rod because the fracture surface is unique. A confusion of individual parts, e.g., during assembly or repair of the motor, is thus ruled out.

Depending on the configuration of the motor, it may be advisable or even necessary to provide an antifriction bearing arrangement, particularly via needle roller bearings, instead of the friction bearing of the connecting rod at the crankshaft that is usually used. This is the case, for example, in large-volume motors or in miniature motors.

If rolling elements are arranged between crankshaft and connecting rod, it is necessary for the outer running face, this means the running face disposed on the connecting rod, to also have a high degree of hardness in order to withstand the constant stress of the rolling elements. Furthermore, it is necessary for assembly reasons that this running face also be configured as a split running face. The use of customary bearing shell halves or of correspondingly configured outer bearing races for the rolling elements is therefore not easily possible. In addition, the simultaneous use of rolling elements on the one hand and a split outer bearing race on the other would increase the physical dimensions of the connecting rod and thus of the material mass that can be moved back and forth inside the motor and thus the weight of the motor, which, inter alia, would have an unfavorable influence on the motor's fuel consumption.

It is possible to provide the bearing seat surfaces of the split bearing seat with a hardness suitable for antifriction bearings, e.g., by means of skin layer hardening. However the materials used for the manufacture of the connecting rods do not have the required carbon content, since an increased carbon content is an obstacle to reshaping as well as mechanical processing. Therefore, it is necessary that, prior to the skin layer hardening, such connecting rods be carburized in a carbon-containing atmosphere. In this process, it must be taken into account that, owing to the special stress on the connecting rod, carburization should only take place in the region of the running face, which means that complex preparatory measures must be taken to avoid carburization of the skin layer of the remainder of the connecting rod.

A further problem during the manufacture of a component with a split running face for rolling elements is that the rolling elements move over the separation location between the bearing cap and the remainder of the connecting rod during each turning movement. Even with the most careful mechanical processing it cannot be ruled out that the separation location will remain in existence in the form of a minimal separation line. Furthermore, there is the risk that the separation line is made larger because of lateral displacement of the bearing cap on the remainder of the component after assembly, both in the radial and in the axial direction, so that the running face no longer has a planar configuration. As a result of both phenomena, premature wear of the rolling elements must be expected, which may lead to motor failure.

The object of the invention is to create a method of producing a component having at least one split running face for rolling elements in which the above-named disadvantages are avoided to the greatest possible extent. Additionally, the implementation of the method should be simple and cost-effective.

SUMMARY OF THE INVENTION

The object is solved in accordance with the invention in that a preform is made from a material having a carbon content of at least 0.5% by weight from which the bearing cap is separated by means of fracture separation, and the component is provided, at least in the region of the running face, with a Rockwell hardness of at least 55, preferably at least 60 according to the cone method, by means of skin layer hardening. Here, it may be provided according to the invention that the separation of the bearing cap by means of fracture separation can take place before or after the skin layer hardening. The preform may be produced, for example, by means of powder-metallurgy methods, e.g., sintering or sinter-forging. This has the advantage that a material having a carbon content necessary for skin layer hardening can be used without additional carburization measures being required. This increased carbon content does not have a disturbing effect during the reshaping process, i.e., sizing or forging, that generally follows the shaping process, since only minor reshaping paths are required. Separating the bearing cap from the remainder of the component by means of fracture separation has the advantage that a lateral displacement in both the axial and the radial direction is avoided to the greatest possible extent. Depending on the subsequent mechanical processing of the running face, a running face without separation lines can therefore be produced, which will also remain intact during operation. This is possible because the seam line between the respective individual parts is an extremely fine, irregular line. Particularly in case of needle roller bearings, one region of the rolling element thus always rests on a planar section of the one or the other part of the running face without having to overcome a separation line as such during the transition from bearing cap to the remainder of the component.

In order to effect a fracture separation between the bearing cap and the remainder of the component at the desired separation location, it is advisable that, in the region of this separation location between bearing cap and the remainder of the component, at least a fracture-initiating notch in the region of the running face be provided. The fracture-initiating notch may, for example, be provided in the preform by means of mechanical processing, for example, milling. Furthermore, it is possible that the pressing tool that is required for the powder-metallurgical production of the preform is provided with suitably configured regions for the forming of the green compact so that the green compact is already provided with the notches prior to the sintering process that follows. The application of fracture-initiating notches in the region of the running face is advisable because, in this manner, it can be assured that the connecting line between the fracture surfaces that oppose each other runs along the diameter of the circular running face and that thus a flawless assembly of the component with the shaft that needs to be supported is possible. Such fracture-initiating notches will, however, generally still be present on the running face even after the assembly of the component. Therefore, a further modification of the invention provides that, after the fracture separation, the fracture-initiating notch is essentially removed completely by mechanical processing and that the skin layer hardening and the mechanical superfinishing of the running face are initiated only thereafter. This has the advantage that the mechanical processing for the removal of the fracture-initiating notch takes place on a component that has not yet been hardened so that simple tools are sufficient for this process.

In another advantageous modification of the invention it is provided that the fracture-initiating notch in the region of the separation location has a depth that is smaller in dimension than the hardening depth that may be achieved by skin layer hardening. Thus it is ensured that during subsequent mechanical processing for the removal of the fracture-initiating notch, the hardened skin layer is not removed by this mechanical processing. Furthermore, there is the advantage that the mechanical rough-working for the removal of the fracture-initiating notch on the one hand and the mechanical superfinishing for precision-fitting manufacture of the running face on the other may be effected during one operation, i.e., during one clamping of the component.

According to the invention it is also possible to produce the preform by means of sinter-forging. Here, it may be provided that the fracture-initiating notch is created during the production of the green compact with suitably configured pressing tools. Between sintering and forging, the surface of the fracture-initiating notch is provided with a protective layer, particularly an oxide layer, which is almost completely closed during subsequent forging to form the preform. Thus, the fracture-initiating notch as such no longer exists, but the applied protective layer prevents a bonding of the powder-metallurgical starting material at this location. The fracture separation, however, still takes place at the desired separation location. This offers the advantage that, after the fracture separation and the assembly of the component, there is no separation line which could impair the rolling of the rolling elements. A mechanical processing for the removal of the fracture-initiating location could thus be eliminated. However, for this configuration of the fracture-initiating notch it is also advisable to remove the fracture-initiating notch, i.e., the regions provided with the protective layer, by means of mechanical processing, because it cannot always be ensured that these skin regions will withstand the stress of the rolling elements which may result in spalling and thus in a destruction of the running face.

Advisably, the bearing cap is again detachably connected to the remainder of the component after having been separated from it. The subsequent processing operations, namely skin layer hardening and/or mechanical processing for the removal of the fracture-initiating notches and/or mechanical superfinishing, may then take place while the component is in the assembled state. On the one hand, this has the advantage that a precision-fitting processing of the individual running face sections forming the split running face can take place. On the other hand, it is only necessary to again separate the individual parts from each other when the connecting rod is assembled, which, on the one hand, avoids confusion of the parts associated with each other to the greatest possible extent and, on the other hand, prevents the fracture surface from being damaged. Damage to the fracture surface, e.g., through mechanical deformation, would mean that the parts could no longer be placed on top of each other and be connected with each other.

For the production of the preform by means of powder-metallurgy methods in accordance with the invention, a sintered material with a carbon content of 0.5 to 1% by weight is used. It is advisable for the carbon content to amount to 0.7% by weight. Depending on the requirements, it may further be provided for the carbon content to exceed 1% by weight, for example, 1 to 2% by weight. A sufficient skin layer hardening can take place because of the high carbon content of the material.

According to the invention, the skin layer hardening can take place by means of induction hardening. This method can be implemented simply and cost-effectively. In the skin layer hardening by means of induction hardening, hardening depths of 0.01 to 6 mm are achieved, depending on the type of method. If the removal of the fracture-initiating notch only takes place after the skin layer hardening, it is advisable to provide for a greater hardening depth so that also after the mechanical removal of the fracture-initiating notch and the subsequent mechanical superfinishing of the running face, a sufficiently hardened layer is present on the component.

For the production of a flawless fracture surface it is necessary for the material to have a sufficient brittle fracture behavior. For this purpose, it may be useful to embrittle the preform at least in the region of the separation location prior to the fracture separation by means of targeted thermal treatment, e.g., cooling. The cooling at the separation location may, for example, take place by means of partial application or spraying of a liquefied gas, e.g., nitrogen.

The invention also relates to a component with at least one split running face for rolling elements which is disposed partially on a bearing cap and partially on the component, the component being provided, at least in the region of the running face, with a hardened skin layer having a Rockwell hardness of at least 55 according to the cone method, and the fracture location between bearing cap and the remainder of the component having a separation surface generated by means of fracture separation. This component consists of a material with a carbon content of at least 0.5% by weight. The component is configured, for example, as a connecting rod for internal combustion engines with a split connecting rod head. It is particularly useful if the component or the connecting rod are produced according to the method of the invention described above.

BRIEF DESCRIPTION OF THE DRAWINGS

The invention is explained in greater detail by way of the drawings. Shown are in.

DETAILED DESCRIPTION OF THE INVENTION

Figure 1:
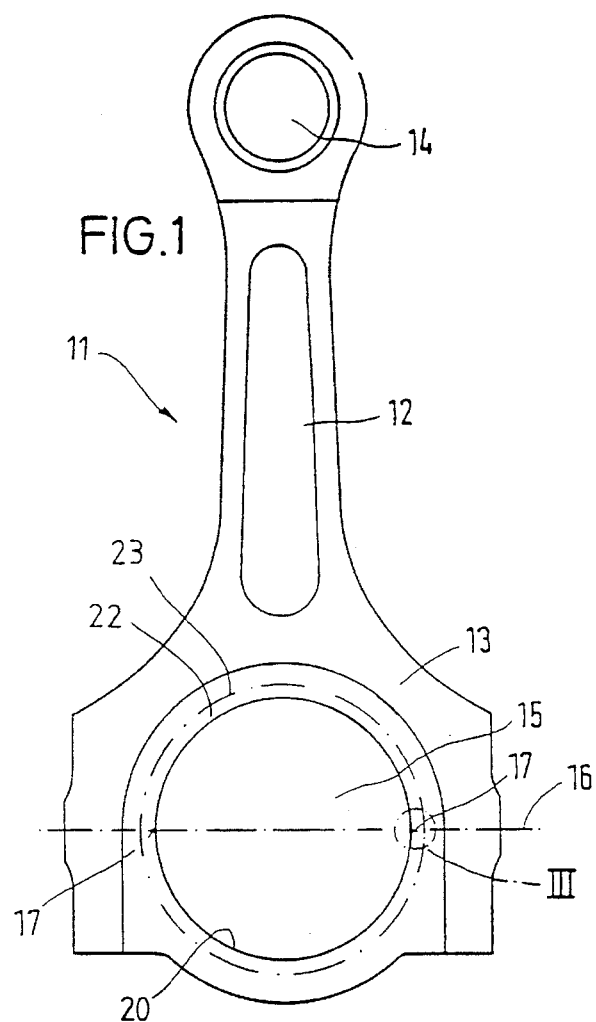
FIG. 1, a view of a connecting rod.

Component 11 shown in the drawing, which is configured as connecting rod, is provided with a shaft 12, a small connecting rod eye 14 and a large connecting rod eye 15. The large connecting rod eye 15 is configured in a split manner, with the embodiment shown in FIGS. 1, 3 and 4 illustrating a state of the connecting rod before the bearing cap 18 has been separated from the remainder of the connecting rod 13 by means of fracture separation.

In the region of the separation location, which essentially runs along plane 16, a fracture-initiating notch 17 or 24 is provided in the region of the running face 20. In order to avoid misunderstandings, it should be pointed out here that the running face is understood to be the respective inner surface of the large connecting rod eye facing the shaft independent of the connecting rod eye's mechanical processing.

Figure 3:
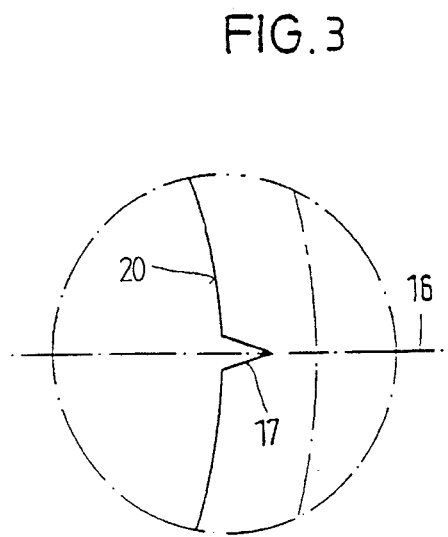
FIG. 3, detail III according to FIG. 1.
Figure 4:
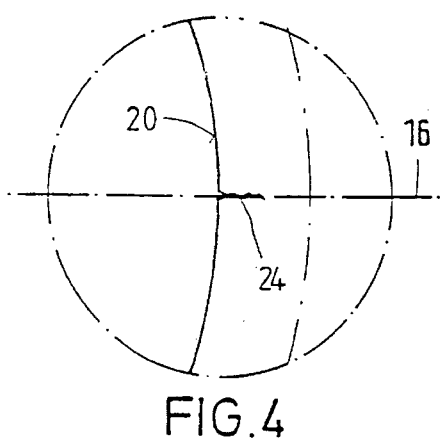
FIG. 4, detail III according to FIG. 1, but in a different embodiment.

According to the embodiment pursuant to FIG. 3, the fracture-initiating notch 17 is incorporated into the running face 20 of the connecting rod 11 in approximately a wedge-shaped manner. Other configurations of the fracture-initiating notch, however, are also possible. The fracture-initiating notch 17 may, for example, be provided on the running face by means of mechanical processing or by suitable configuration of the pressing tool for the production of the green compact. In the embodiment according to FIG. 4, a closed fracture-initiating notch 24 is shown which was closed through the forging process during the production of the preform by means of sinter-forging following the application of a protective layer after sintering. The protective layer is, for example, configured as an oxide layer which is produced in that the preform with the fracture-initiating notch is taken to forging through the ambient atmosphere after sintering. In this case, the original fracture-initiating notch may also have been produced by suitably configured pressing tools or by mechanical processing.

Figure 2:
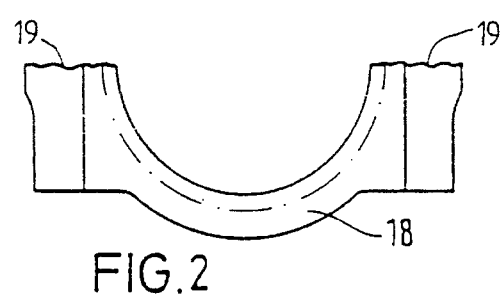
FIG. 2, a bearing cap after fracture separation.

FIG. 2 shows a bearing cap 18 after the same has been separated from the remainder of the connecting rod 13 by means of fracture separation. The separation surface 19 created through fracture separation is provided with a large and irregular surface which only fits onto the corresponding separation surface of the remainder of the connecting rod 13. Normally, the bearing cap 18 is again connected to the remainder of the connecting rod 13 after fracture separation by means of connecting rod screws that are not shown. Here, the bores for the connecting rod screws may be produced before or after fracture separation.

In the region of the running face 20, the connecting rod is provided with a region 22 in which the skin layer has been hardened, illustrated in the drawing by the dot-dash line 23. In the embodiment shown in the drawing, the hardening depth is larger in dimension than the depth of the fracture-initiating notch 17 or 24 so that also after corresponding mechanical processing for the removal of the notch 17 or 24 and subsequent superfinishing for precision-fitting processing of the running face 20, a sufficiently dimensioned layer of greater hardness is provided.

In the embodiment shown in the drawing, the fracture separation would take place after the skin layer hardening. It is, of course, also possible for the skin layer hardening to take place after fracture separation, whereby approximately the same hardening depth—as shown in the drawing—could be set.

The discussion above predominantly refers to a connecting rod produced according to powder-metallurgy methods. Other methods for the production of the connecting rod, for example, forging, are, of course, also possible to the extent that these methods can be applied in view of the increased carbon content. A flawless fracture separation of the component must be ensured in particular.

What is claimed is:

1. A method of producing a component having a split running face for rolling elements, the running face being disposed partially on a bearing cap, comprising the steps of:

making a preform from a material having a carbon content of at least 0.5 percent by weight;

separating the preform by fracture separation at a separation location of the preform thereby producing the bearing cap and a remainder which includes the running face;

performing skin layer hardening on the running face thereby producing a skin hardened layer such that the running face acquires a Rockwell hardness of 55 according to the Rockwell cone method.

2. The method according to claim 1, wherein the step of making includes the step of utilizing powder-metallurgy.

3. The method according to claim 1, wherein the step of performing is performed before the step of separating.

4. The method according to claim 1, wherein the step of performing is performed after the step of separating.

5. The method according to claim 1, further including the step of precision-fittingly processing the running face by mechanically superfinishing the running face.

6. The method according to claim 1, further including the step of detachably connecting the bearing cap to the remainder after the step of separating, wherein the step of performing is performed after the step of detachably connecting.

7. The method according to claim 1, further including the step of:

making a fracture-initiating notch at the separation location of the preform before the step of separating; and removing the notch essentially completely after the step of separating by mechanically processing the bearing cap and the remainder.

8. The method according to claim 7, wherein the step of performing is performed after the step of removing.

9. The method according to claim 8, further including the step precision-fittingly processing the running face by mechanically superfinishing the running face after the step of removing.

10. The method according to claim 7, wherein the step of making a fracture-initiating notch includes the step of making a fracture-initiating notch having a depth smaller than a depth of the skin hardened layer, wherein the method further includes the step of precision-fittingly processing the running face by mechanically superfinishing the running face, wherein the step of removing is performed during the step of precision-fittingly processing.

11. The method according to claim 1, wherein the step of making a preform includes the step of making a preform from a material having a carbon content of 0.5 to 1 percent by weight.

12. The method according to claim 1, wherein the step of making includes the step of making a preform from a material having a carbon content of 0.7 percent by weight.

13. The method according to claim 1, wherein the step of making includes the step of making a preform by sinter-forging, the method further including the steps of:

making a fracture-initiating notch at the separation location of the preform before the step of forging; and making a protective layer over the notch for closing the notch essentially completely during the step of forging.

14. The method according to claim 1, wherein the step of performing includes the step of performing skin layer hardening on the running face by induction hardening.

15. The method according to claim 1, further including the step of making a connecting rod having a split connecting rod head as the component.

16. A component made of a material having a carbon content of at least 0.5 percent by weight and comprising:

a split running face for rolling elements, the running face being disposed partially on a bearing cap;

a hardened layer having a Rockwell hardness of at least 55 according to the Rockwell cone method disposed on at least a region of the running face; and a separation surface between the bearing cap and the component produced by fracture separation of the bearing cap from the component.

17. The component according to claim 16, wherein the material has a carbon content of 0.5 to 1 percent by weight.

18. The component according to claim 16, wherein the material has a carbon content of 0.7 percent by weight.

19. The component according to claim 16, wherein the material is a sintered material.

20. The component according to claim 16, wherein the component is a connecting rod having a split connecting rod end.

* * * * *